United States Patent Office 2,995,420
Patented Aug. 8, 1961

2,995,420
PROCESS FOR TREATING XENOTIME
Larry K. Duncan, Chattanooga, Tenn., and Maurice Peltier, Paris, France, assignors, by mesne assignments, to Vitro Corporation of America, a corporation of Delaware
No Drawing. Filed May 21, 1958, Ser. No. 736,711
9 Claims. (Cl. 23—15)

This invention relates to a process for treating xenotime and in particular to attacking xenotime with sodium carbonate and other alkali metal carbonates.

The process for treating xenotime with aqueous solutions of sodium hydroxide for separating the rare earth metals from other materials contained therein has been previously proposed, as disclosed in copending application Serial No. 710,859, filed January 24, 1958, now abandoned, owned by the same assignee. This process, while providing commercially feasible yields, is carried out at relatively low temperatures and requires a relatively long time to carry out the reaction in order to attain high attack percentages. The caustic soda process is generally unsuitable for a continuous process. Furthermore, due to the low reaction temperature involved in the caustic soda process and other prior art processes, the cerium and thorium contained in the xenotime are not converted to refractory forms which can be more readily separated from the rare earth metals.

It is, therefore, an object of the invention to provide an improved method for the treatment of xenotime in order to recover useful rare earth metals. Another object of the invention is to provide a process for the treatment of xenotime which is carried out at relatively high temperatures for a relatively short time. It is still another object of the invention to provide a process for the treatment of xenotime in which separation of cerium and thorium from the rare earths is facilitated. It is yet another object of the invention to provide a continuous process for the treatment of xenotime. It is still another object of the invention to provide a process for treating xenotime in which the materials used are of a relatively low cost.

Briefly stated, the present invention relates to a process which comprises heating a mixture of xenotime and an alkali metal carbonate in the dry state to a temperature and for a time sufficient to convert at least a portion of the rare earth constituents of xenotime from phosphates to rare earth metal carbonates. The rare earth carbonates may then be separated from the sodium phosphate by suitable leaching processes.

Xenotime is a natural mineral comprised largely of yttrium phosphate as well as gadolinium, terbium, europium, dysprosium, holmium, thulium, and ytterbium phosphates and may or may not contain phosphates of cerium and thorium. Although the alkali metals may be used in the reaction, special preference is given sodium carbonate.

The rate and completeness of the reaction is to a great extent determined by the particle size of the zenotime. Although some attack is obtained with unground sand, the use of extremely fine ore (5 microns diameter) gives much better results as will be seen from the examples below. Therefore, it is preferred that xenotime is first comminuted to a size of less than at least 325 U.S. mesh and desirably less than 10 microns. The xenotime is intimately mixed with sodium carbonate in the dry state. The weight of sodium carbonate, on the dry solids basis, should be at least .78 times the weight of the xenotime, which is the stoichiometric ratio necessary to completely react the xenotime. However, excess amounts of sodium carbonate improves the rate of attack so that a weight ratio of at least 1.5 to 3.0 of sodium carbonate to xenotime is preferred. Excess amounts of alkali metal carbonate are particularly advantageous in the continuous processes where there is apt to be less intimate contact between the sodium carbonate and ore particles.

The reaction mixture of xenotime and alkali metal carbonate is then heated in either a rotary kiln or a static bed to at least about 700° C. and usually not more than about 800° C. Higher temperatures can be used in the static bed than in the continuous process, since there is a tendency for the alkali metal carbonate to stick to the kiln wall which limits the operating temperature of the kiln process to about 700° to 730° C. However, if provisions are made for continuous scraping of the kiln wall, the reaction time is decreased.

The minimum time required for complete reaction is determined by the particle size of the ore and temperature employed. Ordinarily the reaction time will range from a few minutes to several hours.

The reacted product may then be leached with water to remove soluble trisodium phosphate and any excess or unreacted alkali metal carbonate, so as to leave the insoluble rare earth carbonates and oxycarbonates and unattacked mineral impurities. The rare earth carbonates may then be reacted with a suitable acid so as to yield solutions of the rare earth metals, suited to further processing, and to separate them from the mineral impurities.

In order to further illustrate the invention, the following examples are given.

*Static bed attacks*

| $Na_2CO_3$/ore Wt. Ratio | Ore Fineness | Reaction Temp. (° C.) | Time (hrs.) | Percent Attack |
|---|---|---|---|---|
| 1.5 | −325 mesh | 800 | 1.5 | 98 |
| 2.7 | −325 mesh | 800 | 1.5 | 99 |
| 2.5 | −325 mesh | 800 | 1.5 | 91 |
| 2.0 | Sand | 800 | 2–3 | 27 |

*Continuous kiln attacks*

| $Na_2CO_3$/ore Wt. Ratio | Ore Fineness | Max. Temp. (° C.) | Hot Zone Time (mins.) | Percent Attack |
|---|---|---|---|---|
| 1.5 | −325 mesh | 750–800 | 3–4 | 68 |
| 2.5 | −325 mesh | 790 | 3 | 81 |
| 2.0 | −325 mesh | 790 | 3 | 78 |
| 2.0 | −5 microns | 790 | 3 | 100 |
| 2.0 | −325 Mesh | 790 | 7–8 | 78 |
| 2.0 | −325 Mesh | 730–740 | 7–8 | 52 |
| 3.0 | −325 Mesh | 730–740 | 6–7 | 58 |

In addition to the above, a continuous process in a rotary kiln was put into operation under the following and with the following results:

*Plant scale example*

Feed: 2/1 (by wt.) mixture of $Na_2CO_3$ and fine (70–90% less than 10 microns) xenotime. Total ore processed to date: about 5,000 lbs.
Operating temp.: 700°–760° C.
Retention time: 60–90 minutes.
Output: 50–150 lbs. total product/hr. or 20–60 lbs. attacked ore/hr.
Yield: 90–95% of the original rare earths were obtained in acid-soluble form.

Other modes of applying the principle of the invention may be employed, change being made as regards the details described, provided the features stated in any of the following claims or the equivalent of such be employed.

We, therefore, particularly point out and distinctly claim as our invention:

1. The process for treating xenotime in the dry state which comprises mixing xenotime with at least stoichiometric amounts of an alkali metal carbonate, and heating said mixture of xenotime and alkali metal carbonate to a temperature in the range of 700° C. to 800° C. and for a time sufficient to form alkali metal phosphate and convert the rare earth metals of xenotime to carbonates and oxycarbonates.

2. The process for treating xenotime in the dry state which comprises mixing xenotime with at least stoichiometric amounts of an alkali metal carbonate, heating said mixture of xenotime and alkali metal carbonate to a temperature in the range from 700° C. to 800° C. for at least 30 minutes to form alkali metal phosphate and convert the rare earth metals to carbonates and oxycarbonates.

3. The process for treating xenotime in the dry state which comprises comminuting xenotime to a size of approximately less than 325 U.S. mesh, mixing said comminuted xenotime with at least stoichiometric amounts of an alkali metal carbonate, and heating said mixture of comminuted xenotime and alkali metal carbonate to a temperature in the range from 700° C. to 800° C.

4. The process for treating xenotime in the dry state which comprises comminuting xenotime to a size of approximately five microns diameter, mixing said comminuted xenotime with at least stoichiometric amounts of a sodium carbonate, heating said mixture of comminuted xenotime and sodium carbonate to a temperature in the range from 700° C. to 800° C. to form sodium phosphate and insoluble rare earth metal carbonates and oxycarbonates, and leaching the sodium phosphate and any excess sodium carbonate from said reacted mixture.

5. The process for treating xenotime in the dry state which comprises comminuting xenotime to a size of approximately five microns diameter, mixing said comminuted xenotime with at least .78 times its weight of sodium carbonate, heating said mixture of comminuted xenotime and sodium carbonate to a temperature in the range from 700° C. to 800° C. for at least 30 minutes to form sodium phosphate and insoluble rare earth metal carbonates and oxycarbonates, leaching the sodium phosphate and any excess sodium carbonate from said reacted mixture so as to leave said insoluble rare earth metal carbonates and oxycarbonates, and leaching said rare earth metal carbonates and oxycarbonates with an acidic aqueous solution to dissolve said rare earth metal carbonates and oxycarbonates.

6. The process for treating xenotime in the dry state which comprises comminuting xenotime to a size of approximately five microns diameter, mixing said comminuted xenotime with at least .78 times its weight of alkali metal carbonate, heating said mixture of comminuted xenotime alkali metal carbonate to within the range of 700 to 800° C. for 30 to 90 minutes to form alkali metal phosphate and insoluble rare earth metal carbonates and oxycarbonates, leaching the alkali metal metal phosphate and any excess alkali metal carbonate from the reatced mixture so as to leave said insoluble rare earth metal carbonates and oxycarbonates, and leaching said rare earth metal carbonates and oxycarbontaes with an acidic aqueous solution to dissolve said rare earth metal carbonates and oxycarbonates.

7. The process for treating xenotime in the dry state which comprises comminuting xenotime to a size of approximately five microns diameter, mixing said comminuted xenotime with at least 1.5 to 3.0 times its weight of sodium carbonate, heating said mixture of comminuted xenotime sodium carbonate to within the range of 700 to 800° C. for 30 to 90 minutes to form sodium phosphate and insoluble rare earth metal carbonates and oxycarbonates, leaching the sodium phosphate and any excess sodium carbonate from the reacted mixture so as to leave said insoluble rare earth metal carbonates and oxycarbonates, and leaching said rare earth metal carbonates and oxycarbonates with an acidic aqueous solution to dissolve said rare earth carbonates and oxycarbonates.

8. The process for treating xenotime in the dry state which comprises comminuting xenotime to a size of approximately five microns diameter, mixing said comminuted xenotime with at least 1.5 to 3.0 times its weight of alkali metal carbonate, and heating said mixture of comminuted xenotime alkali metal carbonate to within the range of 700 to 800° C. for 30 to 90 minutes to form alkali metal phosphate and insoluble rare earth metal carbonates and oxycarbonates.

9. The process for treating xenotime in the dry state which comprises comminuting xenotime to a size of aproximately five microns diameter, mixing said comminuted xenotime with at least 1.5 to 3.0 times its weight of sodium carbonate, heating said mixture of comminuted xenotime sodium carbonate to within the range of 700 to 800° C. for 30 to 90 minutes to form sodium phosphate and insoluble rare earth metal carbonates and oxycarbonates, and leaching the sodium phosphate and any excess sodium carbonate from said heated mixture so as to leave said insoluble rare earth metal carbonates and oxycarbonates.

References Cited in the file of this patent

UNITED STATES PATENTS

| | | |
|---|---|---|
| 567,571 | Barriere | Sept. 8, 1896 |
| 2,783,125 | Rohden et al. | Feb. 26, 1957 |
| 2,815,264 | Calkins et al. | Dec. 3, 1957 |

OTHER REFERENCES

Mellor: "Comprehensive Treatise on Inorganic and Theoretical Chemistry," Longmans, Green and Co., N.Y., vol. 5, pages 527, 528 (1924).

UNITED STATES PATENT OFFICE
CERTIFICATE OF CORRECTION

Patent No. 2,995,420  August 8, 1961

Larry K. Duncan et al.

It is hereby certified that error appears in the above numbered patent requiring correction and that the said Letters Patent should read as corrected below.

Column 1, line 59, for "zenotime" read -- xenotime --; column 2, lines 13, and 62, for "700°", each occurrence, read -- 700° C. --; column 4, lines 1, 15, 31, and 40, for "700", each occurrence, read -- 700° C. --; same column 4, line 5, for "reatced" read -- reacted --.

Signed and sealed this 12th day of December 1961.

(SEAL)
Attest:

ERNEST W. SWIDER
Attesting Officer

DAVID L. LADD
Commissioner of Patents
USCOMM-DC